(12) United States Patent
Spas

(10) Patent No.: US 10,817,169 B2
(45) Date of Patent: Oct. 27, 2020

(54) TIME-CORRELATED INK

(71) Applicant: Microsoft Technology Licensing, LLC, Redmond, WA (US)

(72) Inventor: Lukasz Stanislaw Spas, Lund (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/639,298

(22) Filed: Jun. 30, 2017

(65) Prior Publication Data

US 2018/0107371 A1  Apr. 19, 2018

Related U.S. Application Data

(60) Provisional application No. 62/408,424, filed on Oct. 14, 2016.

(51) Int. Cl.
| | |
|---|---|
| *G06F 17/20* | (2006.01) |
| *G06F 3/0488* | (2013.01) |
| *H04N 5/91* | (2006.01) |
| *G06K 9/00* | (2006.01) |
| *G06K 9/46* | (2006.01) |
| *G06K 9/62* | (2006.01) |
| *G06K 9/22* | (2006.01) |
| *G11B 27/32* | (2006.01) |
| *G11B 27/031* | (2006.01) |

(Continued)

(52) U.S. Cl.
CPC ........ *G06F 3/04883* (2013.01); *G06F 16/447* (2019.01); *G06F 16/7867* (2019.01); *G06K 9/00416* (2013.01); *G06K 9/222* (2013.01); *G06K 9/4604* (2013.01); *G06K 9/469* (2013.01); *G06K 9/6224* (2013.01); *G06T 13/80* (2013.01); *G11B 27/005* (2013.01); *G11B 27/031* (2013.01); *G11B 27/036* (2013.01); *G11B 27/32* (2013.01); *G11B 27/34* (2013.01); *H04N 5/91* (2013.01); *H04N 5/9305* (2013.01); *G06F 2207/222* (2013.01)

(58) Field of Classification Search
CPC .................................................. G06F 3/04883
See application file for complete search history.

(56) References Cited

U.S. PATENT DOCUMENTS

| | | | |
|---|---|---|---|
| 5,600,775 A | 2/1997 | King et al. | |
| 2001/0036318 A1* | 11/2001 | Komatsu | ............. G06F 3/04883 382/202 |

(Continued)

FOREIGN PATENT DOCUMENTS

WO   2015061231 A1   4/2015

OTHER PUBLICATIONS

"International Search Report and Written Opinion Issued in PCT Application No. PCT/US2017/055814", dated Jan. 25, 2018, 13 Pages.

(Continued)

*Primary Examiner* — Mohammed H Zuberi
(74) *Attorney, Agent, or Firm* — Fiala & Weaver P.L.L.C.

(57) ABSTRACT

Techniques for time-correlated ink are described. According to various embodiments, ink input is correlated to content. For instance, ink input received during playback of a video is timestamped. According to various embodiments, ink input displayed over content is removed after input ceases. Further, ink input is displayed during playback of the portion of content to which the ink input is time correlated.

20 Claims, 14 Drawing Sheets

(51) Int. Cl.
*G06F 16/44* (2019.01)
*G06F 16/78* (2019.01)
*G06T 13/80* (2011.01)
*G11B 27/00* (2006.01)
*G11B 27/036* (2006.01)
*G11B 27/34* (2006.01)
*H04N 5/93* (2006.01)

(56) References Cited

U.S. PATENT DOCUMENTS

| | | |
|---|---|---|
| 2002/0163548 A1 | 11/2002 | Chiu et al. |
| 2002/0190965 A1 | 12/2002 | Lemon |
| 2006/0001667 A1* | 1/2006 | LaViola, Jr. ............ G06T 13/80 345/473 |
| 2007/0067707 A1* | 3/2007 | Travis .................. G11B 27/031 715/203 |
| 2007/0214407 A1 | 9/2007 | Bargeron et al. |
| 2008/0236904 A1 | 10/2008 | Zukowski et al. |
| 2010/0302189 A1* | 12/2010 | Liu ..................... G06F 3/04883 345/173 |
| 2011/0279379 A1* | 11/2011 | Morwing .............. G06F 3/0237 345/173 |
| 2013/0145269 A1 | 6/2013 | Latulipe et al. |
| 2014/0363083 A1* | 12/2014 | Xia .................... G06K 9/00436 382/189 |
| 2015/0116272 A1* | 4/2015 | Black .................. G06F 3/03545 345/175 |
| 2015/0206446 A1 | 7/2015 | Gupta et al. |
| 2015/0370772 A1 | 12/2015 | Wang et al. |
| 2016/0379385 A1* | 12/2016 | Tu ......................... H04M 3/567 345/441 |
| 2018/0225037 A1* | 8/2018 | Tran ................... G06F 3/04883 |

OTHER PUBLICATIONS

Robert, Culler, S., "A Software Library for Developing Data Structures Applications for the Tablet PC", Retrieved From: <<https://people.cs.clemson.edu/~pargas/tabletpc/CullerTabletPCMastersPaper.pdf>>, Mar. 29, 2005, 58 Pages.

Bargeron, et al., "Annotations for Streaming Video on the Web: System Design and Usage Studies", In Technical Report MSR-TR-98-60, Mar. 1, 1999, 2 pages.

Preece, Jeph, "Livescribe 3 Smartpen: The Future of Digital Pens", http://www.toptenreviews.com/electronics/articles/livescribe-3-smartpen-the-future-of-digital-pens/, Published on: Dec. 3, 2013, 3 pages.

* cited by examiner

TIME-CORRELATED INK

RELATED APPLICATIONS

This application claims priority under 35 U.S.C 119(e) to U.S. Provisional Application Ser. No. 62/408,424, filed Oct. 14, 2016 and titled "Time Correlated Ink", the entire disclosure of which is incorporated herein by reference in its entirety.

BACKGROUND

Devices today (e.g., computing devices) typically support a variety of different input techniques. For instance, a particular device may receive input from a user via a keyboard, a mouse, voice input, touch input (e.g., to a touchscreen), and so forth. One particularly intuitive input technique enables a user to utilize a touch instrument (e.g., a pen, a stylus, a finger, and so forth) to provide freehand input to a touch-sensing functionality such as a touchscreen, which is interpreted as digital ink. The freehand input may be converted to a corresponding visual representation on a display, such as for taking notes, for creating and editing an electronic document, and so forth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for time-correlated ink are described. According to various embodiments, ink input is correlated to content. For instance, ink input received during playback of a video is timestamped. According to various embodiments, ink input displayed over content is unwound after input ceases. Further, ink input is displayed during playback of the portion of content to which the ink input is time correlated.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Implementations discussed herein enable time-correlated ink. Generally, ink refers to freehand input to a touch-sensing functionality such as a touchscreen, which is interpreted as digital ink, referred to herein as "ink." Ink may be provided in various ways, such as using a pen (e.g., an active pen, a passive pen, and so forth), a stylus, a finger, and so forth.

According to various implementations, time-correlated ink enables ink input to be timestamped and/or temporally sorted and grouped to enable storage, playback, and searching of ink input based on temporal correlation. In an example implementation, portions of ink input received over video playback content are timestamped. For instance, a user inputs the ink via a pen over video content during playback, and the ink input is temporally correlated to the video content over which the ink input is input. In at least one implementation, the ink input can be organized and sorted into a tree structure for storage and retrieval based on the time intervals of ink strokes that make up the ink input. Generally, the stored and timestamped ink strokes enable the ink input to be retrieved and displayed over the video content during subsequent playback of the same portion of the video content as when the ink input was applied originally.

In at least some implementations, ink input that is applied over video content is unwound gradually after ink input ceases to be received and/or after a specified time interval. For instance, a timer begins after ink input ceases and the displayed ink input is visually unwound at the expiration of the timer. In one or more implementations, the ink input may displayed or removed in reverse based on input received indicating a rewind action of the video content. Thus, techniques described herein simplify interactions with video content by correlating ink input to the playback content in a temporal domain.

Having presented an overview of techniques for time-correlated ink, consider now an example environment in which techniques described herein may be implemented.

Figure 1:
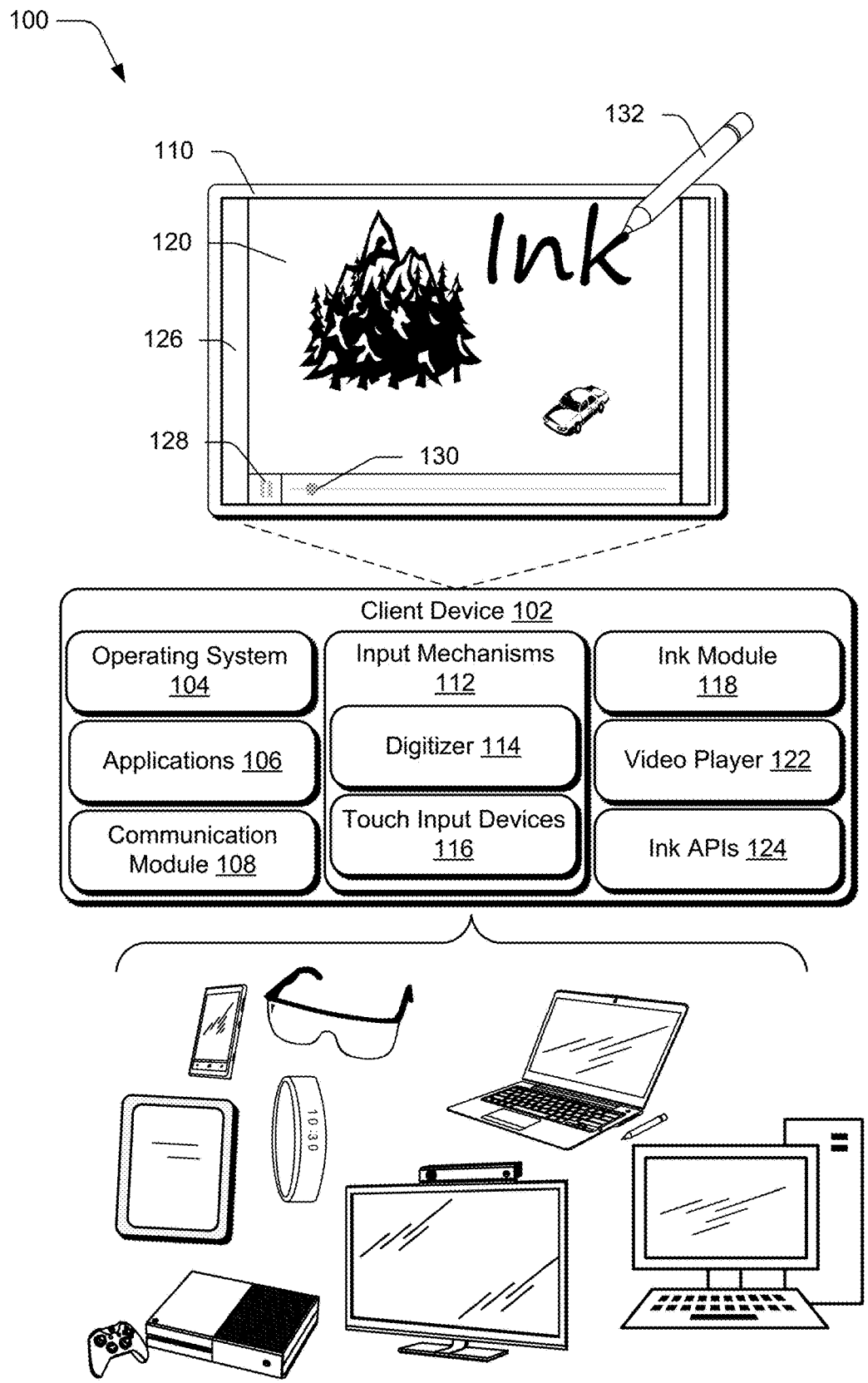
FIG. 1 is an illustration of an environment in an example implementation that is operable to employ techniques discussed herein in accordance with one or more embodiments.

FIG. 1 is an illustration of an environment 100 in an example implementation that is operable to employ techniques for time-correlated ink discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of a client device 102 is shown and described below in FIG. 14.

The client device 102 includes a variety of different functionalities that enable various activities and tasks to be performed. For instance, the client device 102 includes an operating system 104, applications 106, and a communication module 108. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 represent functionality for performing different tasks via the client device 102. Examples of the applications 106 include a word processing application, a spreadsheet application, a web browser, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The communication module 108 is representative of functionality for enabling the client device 102 to communicate over wired and/or wireless connections. For instance, the communication module 108 represents hardware and logic for communication via a variety of different wired and/or wireless technologies and protocols.

The client device 102 further includes a display device 110, input mechanisms 112 including a digitizer 114 and touch input devices 116, and an ink module 118. The display device 110 generally represents functionality for visual output for the client device 102. Additionally, the display device 110 represents functionality for receiving various types of input, such as touch input, pen input, and so forth. The input mechanisms 112 generally represent different functionalities for receiving input to the client device 102. Examples of the input mechanisms 112 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 112 may be separate or integral with the display device 110, with integral examples including gesture-sensitive displays with integrated touch-sensitive or motion-sensitive sensors. The digitizer 114 generally represents functionality for converting various types of input to the display device 110 and the touch input devices 116 into digital data that can be used by the client device 102 in various ways, such as for generating digital ink.

According to various implementations, the ink module 118 represents functionality for performing various aspects of techniques for time-correlated ink discussed herein. The ink module 118, for instance, can be leveraged to correlate ink strokes applied by a user to content playing on the client device 102. Various functionalities of the ink module 118 are discussed below.

For example, ink is applied on the display device 110 to video content 120 playing via a video player application ("video player") 122. As used herein, the video content 120 may include various combinations of progressively sequenced content presented for display including live content, pre-recorded content, multi-media streams, slideshows, audio files, video files, animations, web pages, content for display by a browser or other client application, and so forth. Thus, while the video content 120 is depicted as the content presented at the display device 110, it should be understood that various types of content may be presented as discussed above and below.

The video player 122 represents an instance of the applications 106 providing various functionality for management, processing, and playback of the video content 120 and other content. Functionality provided by the video player 122 may include but is not limited to functionality to organize, access, browse, and view video content, as well as to perform various kinds of video processing operations upon selected video content. The video player 122 is configured to support ink experiences for the video content 120 by invoking functionality of the ink module 118, as discussed above and below. In an implementation, the ink module 118 is implemented as a system component (e.g., a component of the operating system 104) that is accessible to provide inking functionality to the applications 106 of the device (including the video player 122) via corresponding ink application programming interfaces ("APIs") 124, communication mechanisms, interaction scenarios, and so forth. The ink APIs 124 generally represent APIs that can be leveraged by the ink module 118 to perform aspects of time correlated ink discussed herein. Alternatively, the ink module 118 is provided as an integrated component of the video player 122.

As depicted in the environment 100, the video player 122 presents a graphical user interface ("GUI") 126 that is output on the display device 110. By configuring the GUI 126 in the various ways described herein, the ink module 118 enables ink interactions with content. The video player 122 provides GUI elements operable to manage playback of the video content 120. The example GUI 126 of the video player 122 includes the video content 120 and the GUI elements. The GUI elements include a playback control 128 selectable to pause/resume the playback of the video content 120 and a time marker 130 that displays a point in time of the duration of the video content 120. The time marker 130 is selectable via user input to move the time marker 130 along a slider to adjust the point of playback of the video content 120. For example, a user selects the time marker 130 by placing a finger over the time marker 130 and slides the time marker 130 to the right to advance playback of the video content 120.

As an alternative to using the playback control 128, a user may be able to control the playback of the video content 120 by interacting with the video content 120 displayed by the video player 122. For instance, by tapping or clicking the video content 120, the playback of the video content 120 may be paused/resumed. Further by performing swiping actions on the video content 120 (or by tapping or clicking on the left and right edges of the video content 120) the playback will advance.

The environment 100 further includes a pen 132, which is representative of an input device for providing input to the display device 110. Generally, the pen 132 is in a form factor of a traditional pen but includes functionality for interacting with the display device 110 and other functionality of the client device 102. In at least some implementations, the pen 132 is an active pen that includes electronic components for interacting with the client device 102. The pen 132, for instance, includes a battery that can provide power to internal components of the pen 132. Alternatively or additionally, the pen 132 may include a magnet or other functionality that supports hover detection over the display device 110. This is not intended to be limiting, however, and in at least some implementations the pen 132 may be passive, e.g., a stylus without internal electronics. Generally, the pen 132 is representative of an input device that can provide input that can be differentiated from other types of input by the client device 102. For instance, the digitizer 114 is configured to differentiate between input provided via the pen 132, and input provided by a different input mechanism such as a user's finger, a stylus, and so forth.

According to various implementations, the pen 132 can be used to apply ink input to content presented by the video player 122. As the ink input is applied, the ink module 118 can time stamp the ink input to enable the ink input to be played back and searched in a time correlated manner.

Having described an example environment in which the techniques described herein may operate, consider now a discussion of some example implementation scenarios in accordance with one or more embodiments. The implementation scenarios may be implemented in the environment 100 discussed above, and/or any other suitable environment.

Figure 2:
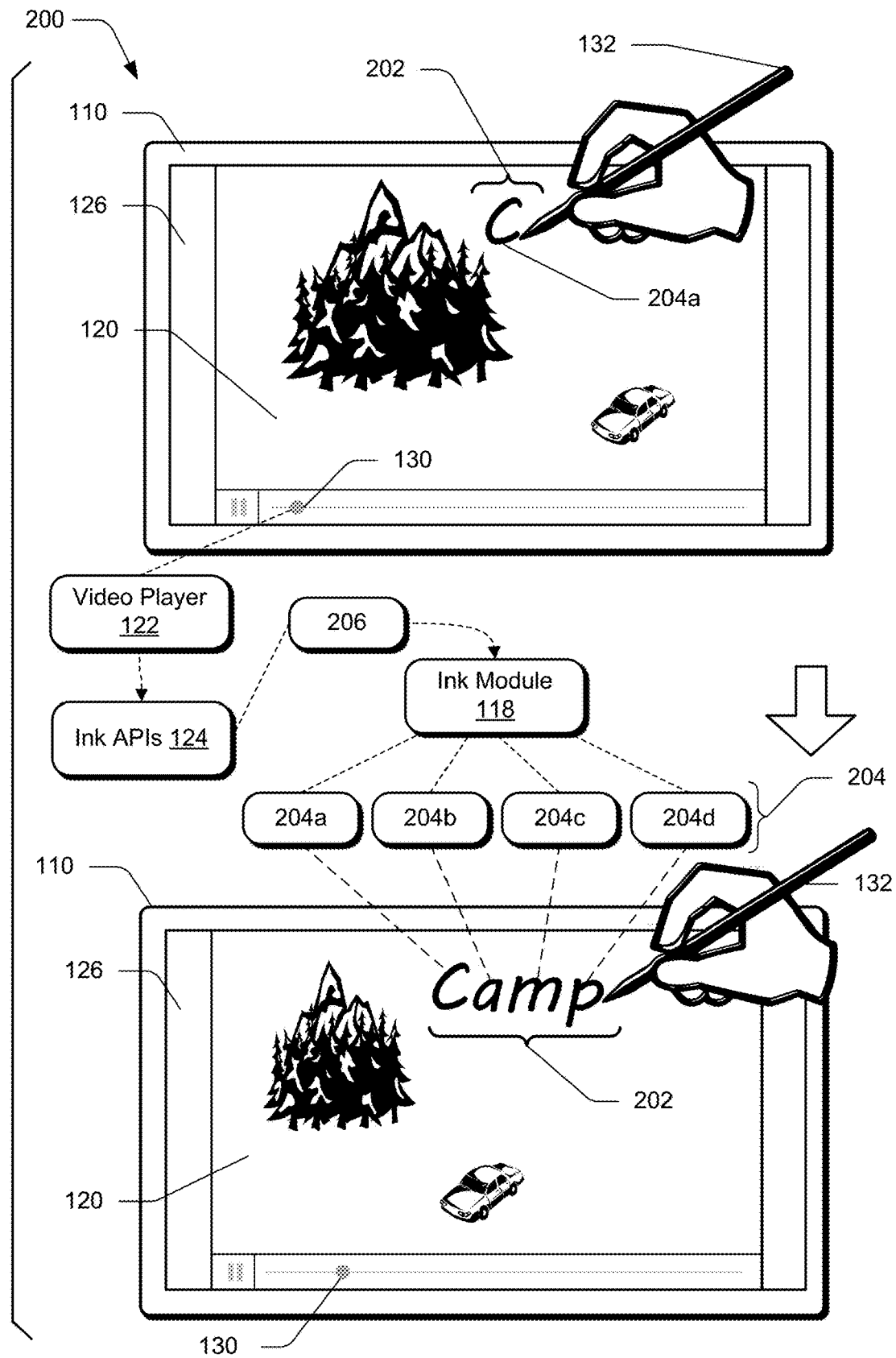
FIG. 2 depicts an example implementation scenario for receiving ink input correlated to content in accordance with one or more embodiments.

FIG. 2 depicts an example implementation scenario 200 for receiving ink input correlated to content in accordance with one or more implementations. The scenario 200 includes various entities and components introduced above with reference to the environment 100.

The upper portion of the scenario 200 includes the video player 122 presenting the GUI 126 on the display device 110. Displayed within the GUI 126 is the video content 120. Also depicted is a user holding the pen 132. While the pen 132 is depicted as a mechanical implement held in the hand of the user, it should be understood that the pen 132 may be implemented in various ways, such as a finger, an optical signal, and so forth.

During playback of the video content 120, a user starts applying ink input 202 to the video content 120 using the pen 132. According to various implementations, when the ink input 202 is applied to the video content 120, application of the ink input 202 is recorded by the ink module 118 in real-time. For instance, ink strokes 204 of the ink input 202 are time correlated (e.g., timestamped) by the ink module 118 according to techniques for time-correlated ink discussed herein. The ink strokes 204, for instance, are correlated to a particular time, such as a corresponding playback time for the video content 120 in which the ink strokes 204 are applied as indicated by the time marker 130. For example, playback time values ("time values") 206 for the video content 120 are received by the ink module 118 from the video player 122 via a call to the ink APIs 124. According to one or more implementations, each frame in the video content 120 has a respective time value 206 that is used to timestamp the ink input 202.

Further to the scenario 200, the ink module 118 receives the time values 206 for frames of the video content 120 that include the ink input 202 and uses the time values 206 to timestamp corresponding ink strokes 204 of the ink input 202. For instance, the ink module 118 records the ink strokes 204 (complete or partial) from the ink input 202 based on the time values 206 including a start timestamp (start_time) and an end timestamp (end_time) for each ink stroke 204 from the ink input 202.

The lower portion of the scenario 200 shows that the user continues to apply the ink input 202 to the video content 120 while playback of the video content 120 proceeds, as depicted by change in the position of the time marker 130 and the video content 120 compared to the upper portion of the scenario 200. In this particular implementation, the ink input 202 includes the ink strokes 204*a*, 204*b*, 204*c*, 204*d*, that spell a word, i.e., "Camp."

Various time values may be recorded by the ink module 118 for the ink input 202. In at least some implementations, when the pen 132 touches the display device 110 (pen_down) the ink module 118 records a timestamp from the video content 120 as an offset_time for the of the ink input 202. As the strokes of the ink input 202 are being drawn, points of the ink input 202 are sampled at a constant rate. A pen_up of the ink input 202 is recorded by the ink module 118 when the pen 132 is removed from the display device 110, for instance. A duration of the ink input 202 is calculated by the ink module 118 from the equation: pen_up−pen_down. Start_time is defined as the offset_time and end_time is defined as offset_time+duration.

Figure 3:
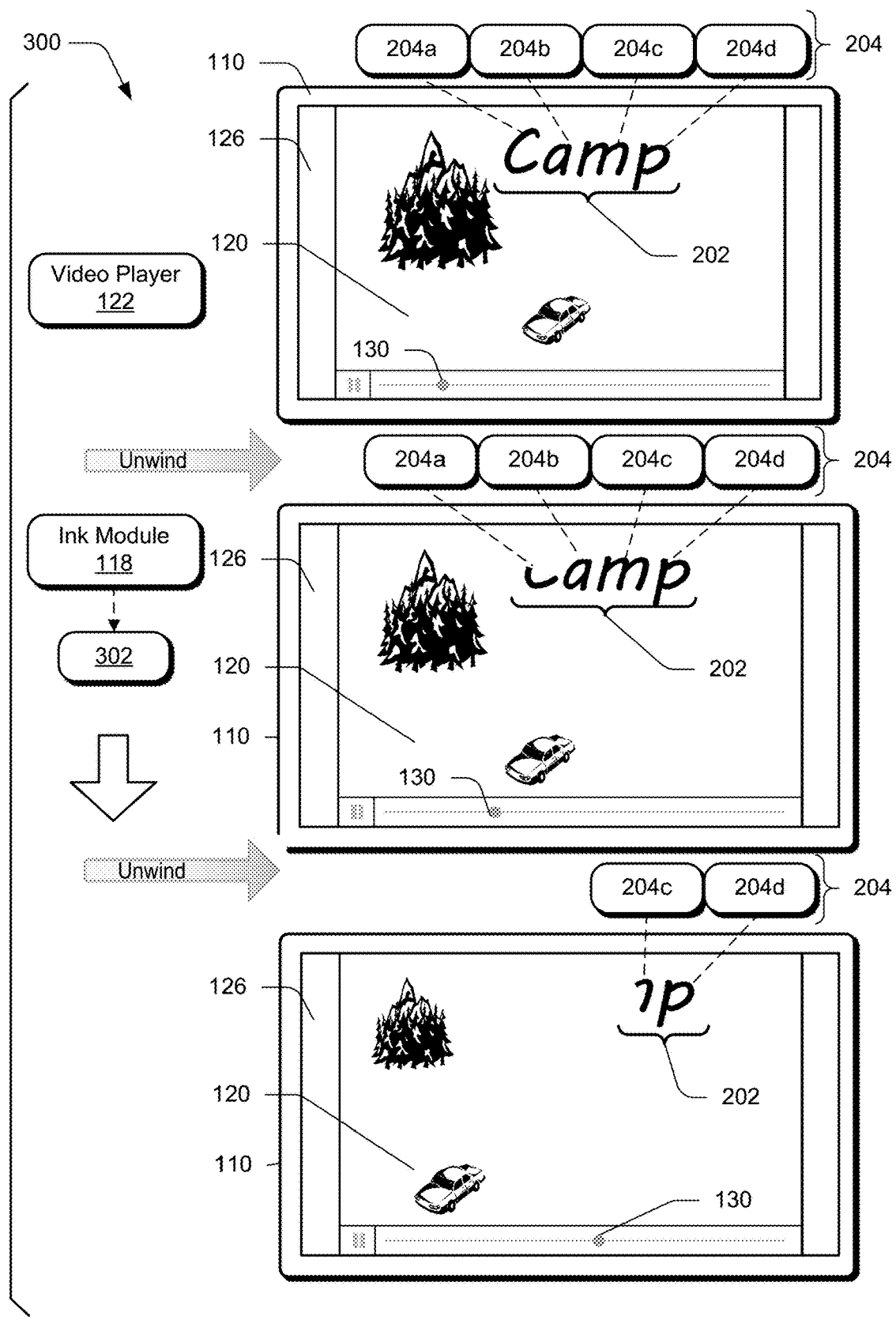
FIG. 3 depicts an example implementation scenario for removing ink input over content in accordance with one or more embodiments.

FIG. 3 depicts an example implementation scenario 300 for removing ink input over content in accordance with one or more implementations. The scenario 300 includes various entities and components introduced above with reference to the environment 100 and the scenario 200, and in at least some implementations represents an extension of the scenario 200.

The scenario 300 includes the video player 122 presenting the GUI 126 on the display device 110 with the ink input 202. At the upper portion of the scenario 300, consider that after the user applies the ink input 202, the user stops applying ink, e.g., the pen 132 is lifted from the surface of the display device 110. The ink module 118 ceases to receive the ink input 202 and starts a timer 302 as playback of the video content 120 proceeds.

According to various implementations, after the timer 302 expires during playback of the video content 120, the ink module 118 begins to gradually remove the ink input 202 over a duration of time. For instance, as shown here in the middle portion of the scenario 300, after the ink input 202 is applied and the timer 302 expires, the ink input 202 begins to unwind, e.g., visually disappear from the video content 120. Proceeding to the lower portion of the scenario 300, the ink input 202 continues to unwind until the ink input 202 is completely removed from display over the video content 120.

The unwinding of the ink input 202 may take various forms. For instance, an animation may be implemented where the ink module 118 causes the ink input 202 to gradually display or disappear, such as to imitate the way in which the ink input 202 was originally applied by the user. The ink input 202, for example, may disappear as an animation from the video content 120 and/or at a velocity that approximately matches a velocity at which the ink input 202 was applied by the user via the pen 132.

In at least some implementations, the velocity at which the ink input 202 visually unwinds may be determined based on the timestamps associated with the ink input 202, a distance between a start and end of the ink input 202, and/or a sampling rate at which the ink input 202 is detected. Alternatively, the ink input 202 can be removed all at once (e.g., after the timer 302 expires) such that the ink strokes 204a, 204b, 204c, 204d, that make up the ink input 202 are removed from display at the same time.

The lower portion of the scenario 300 shows the ink input 202 unwinding from the video content 120 while playback of the video content 120 proceeds, as depicted by change in the position of the time marker 130 and the video content 120 compared to the upper and middle portions of the scenario 300.

Thus, the scenario 300 illustrates that in this particular implementation, the ink input 202 is gradually removed in an order in which the ink input 202 was applied by the pen 132. Thus, the ink stroke 204a is partially removed in the middle portion of the scenario 300 and the ink strokes 204a and 204b are completely removed in the lower portion of the scenario 300 while playback of the video content 120 continues.

Figure 4:
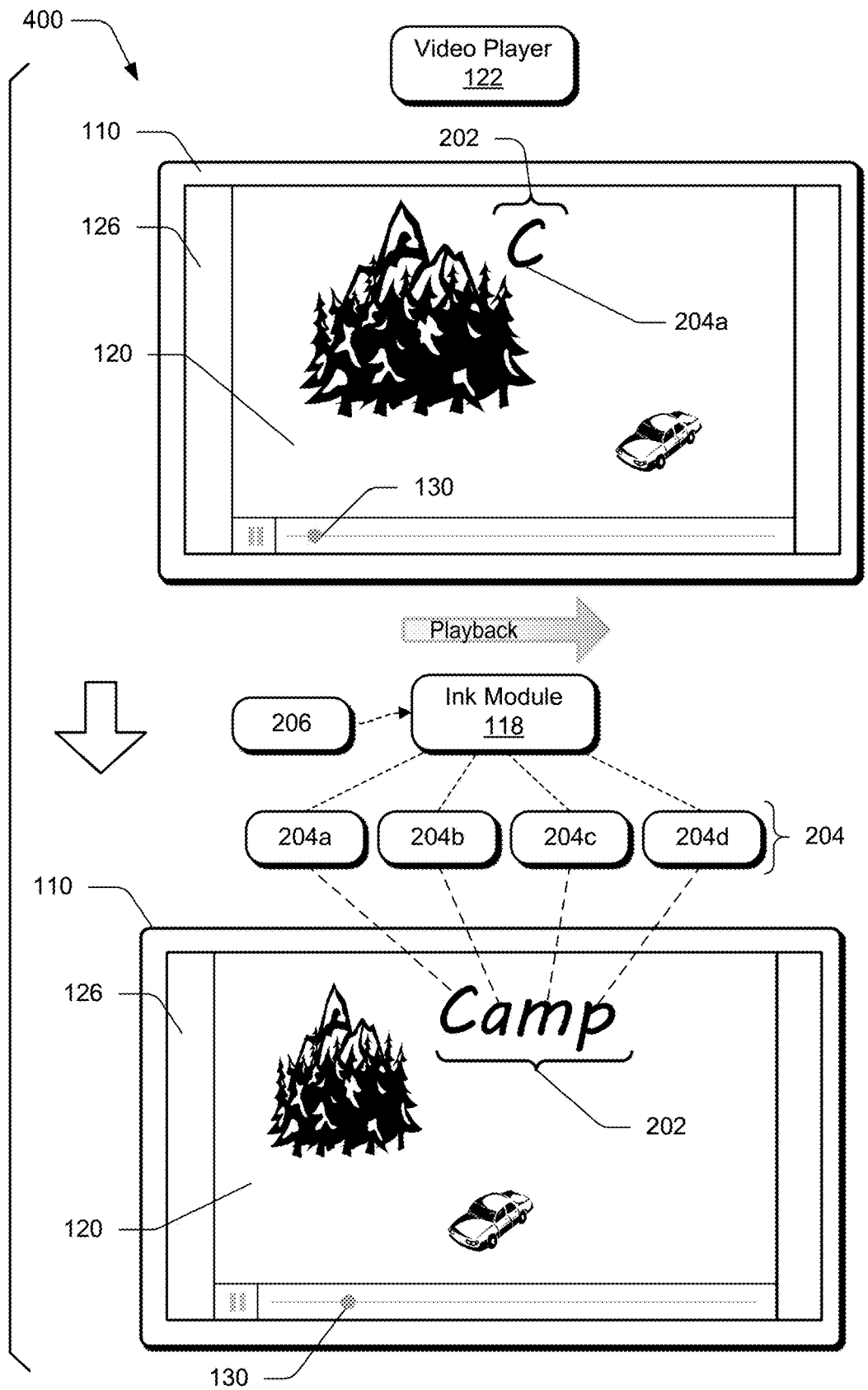
FIG. 4 depicts an example implementation scenario for displaying ink input over content in accordance with one or more embodiments.

FIG. 4 depicts an example implementation scenario 400 for displaying ink input over content in accordance with one or more implementations. The scenario 400 includes various entities and components introduced above with reference to the environment 100 and the scenarios 200, 300, and in at least some implementations represents an extension of the scenarios 200, 300.

The scenario 400 illustrates playback of the ink input 202 correlated to the video content 120 after the ink input 202 has already been applied. For instance, playback of the ink input 202 may occur upon rewinding the video content 120 to a playback time before the ink input 202 was applied. Alternatively and additionally, playback of the ink input 202 may occur upon playing back the video content 120 at a different time than when the ink input 202 was applied. The scenario 400 includes the video player 122 presenting the video content 120 via the GUI 126 on the display device 110.

In the scenario 400, the video content 120 is played from a portion of the video content 120 when the ink input 202 was initially applied. As playback of the video content 120 continues, the ink module 118 causes the ink input 202 (e.g., the ink strokes 204a, 204b, 204c, 204d) to begin to reappear at the corresponding playback time for the video content 120 in which the ink input 202 was applied, as indicated by the time values 206. The playback of the ink input 202 may take various forms. For instance, the ink input 202 may reappear as an animation on the video content 120 and/or at a velocity that approximately matches a velocity which the ink input 202 was applied. In at least some implementations, the velocity at which the ink input 202 visually reappears may be determined based on the timestamps associated with the ink input 202, a distance between a start and end of the ink input 202, and/or a sampling rate at which the ink input 202 was detected. Thus, the ink input 202 that was originally applied by the user becomes a part of the video content 120 and is tied by time correlation to portions of the video content 120 such that when playback of the video content 120 matches a particular time value 206 during which the ink input 202 was applied (e.g., start_time), playback of the ink input 202 is presented along with playback of the video content 120.

According to various implementations, the lower portion of the scenario 400 shows that as playback of the video content 120 continues, the ink strokes 204a, 204b, 204c, 204d, that make up the ink input 202 are displayed. The playback point for the video content 120 represented in the lower portion of the scenario 400, for instance, represents a playback point at which the user ceased applying the ink input 202 but prior to the ink input 202 unwinding as described above.

Figure 5:
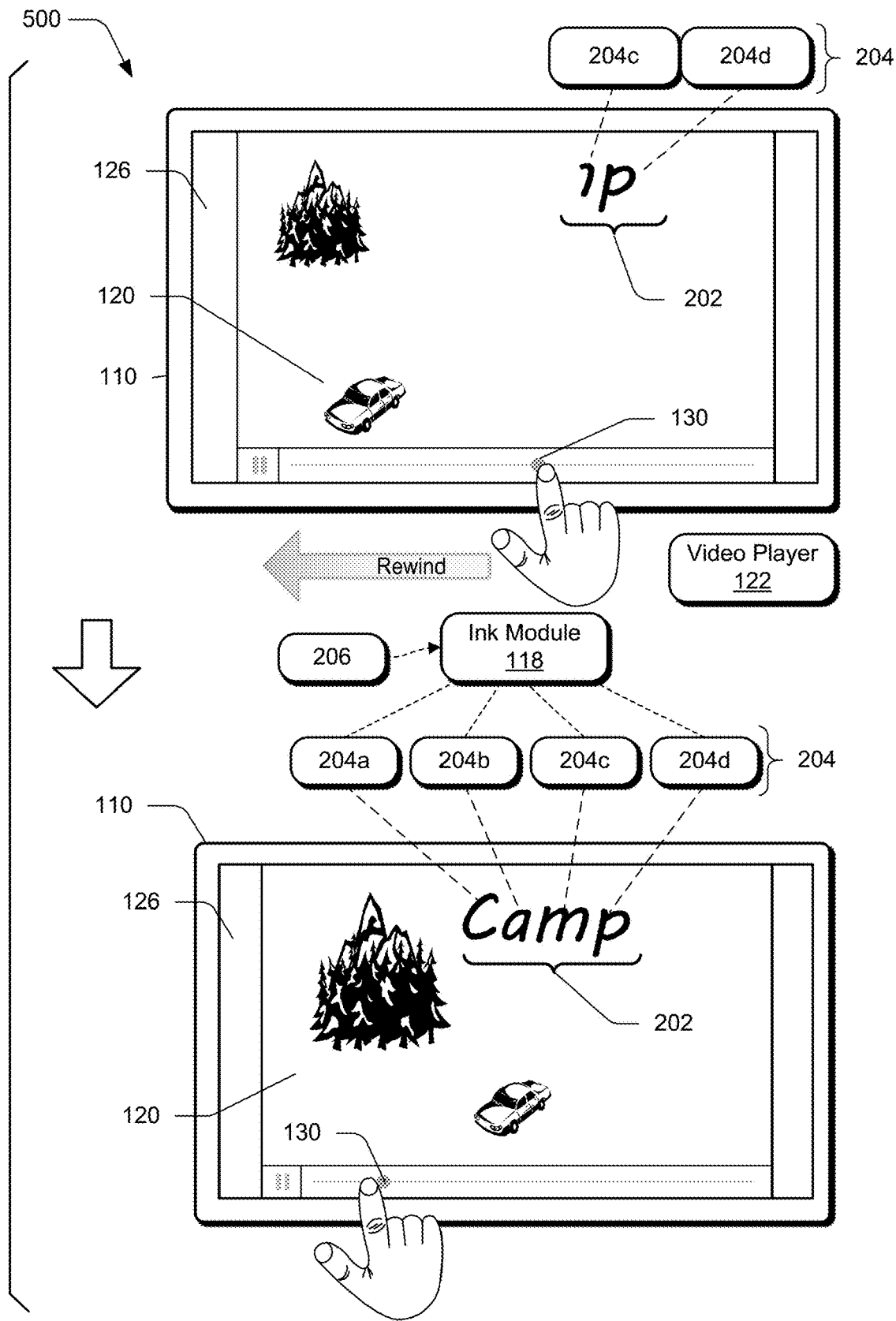
FIG. 5 depicts an example implementation scenario for rewinding ink input over content in accordance with one or more embodiments.

FIG. 5 depicts an example implementation scenario 500 for rewinding ink input over content in accordance with one or more implementations. The scenario 500 includes various entities and components introduced above with reference to the environment 100 and the scenarios 200-400, and in at least some implementations represents an extension of the scenarios 200-400.

The scenario 500 illustrates rewind playback of the ink input 202 correlated to the video content 120 after the ink input 202 has already been applied. For instance, rewind playback of the ink input 202 may occur while rewinding the video content 120 from a time after the ink input 202 was applied. The scenario 500 includes the video player 122 presenting the video content 120 via the GUI 126 on the display device 110.

In the scenario 500, the time marker 130 is slid to the left to cause a rewinding playback of the video content 120. Accordingly, the video content 120 is rewound from a portion of the video content 120 after the ink input 202 was applied. According to various implementations, as rewind of the video content 120 continues, the ink module 118 causes the ink input 202 (e.g., the ink strokes 204a, 204b, 204c, 204d) to begin to reappear at the corresponding playback time for the video content 120 in which the ink input 202 ceased to be received and/or after the ink input 202 finished unwinding. The rewind playback of the ink input 202 may take various forms. For instance, the ink input 202 may reappear as an animation on the video content 120 and/or at a velocity that approximately matches a velocity which the ink input 202 was applied. In at least some implementations, the velocity at which the ink input 202 visually reappears may be determined based on the timestamps associated with the ink input 202, a distance between a start and end of the ink input 202, and/or a sampling rate at which the ink input 202 was detected.

The lower portion of the scenario 500 illustrates the end of the rewind action of the video content 120. In this particular implementation, time marker 130 is slid to the left to rewind the video content 120 to a point at which the ink stroke 204a was originally applied. Notice that as the video content 120 rewinds, the ink input 202 begins to reappear in a reverse order to the original application of the ink input 202, e.g., the ink stroke 204d reappears, followed by ink strokes 204c, 204b, 204a, respectively. For instance, when the video content 120 reaches the time value 206 with which the ink input 202 is correlated (end_time), the ink module 118 causes the corresponding ink input 202 (in this case, the ink stroke 204d) to begin reappearing over the video content 120.

Figure 6:
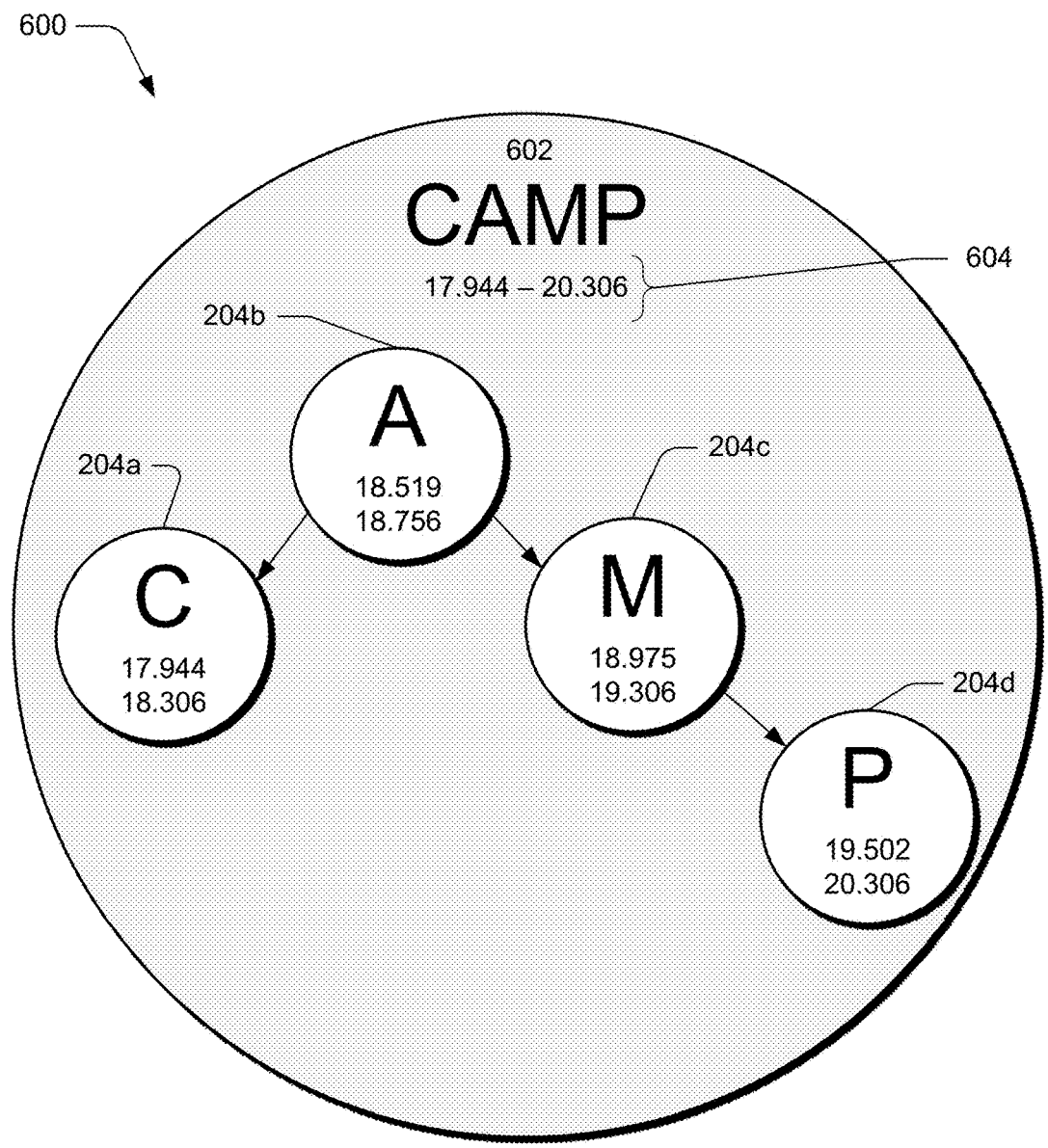
FIG. 6 depicts an example implementation scenario for organizing ink strokes in a tree structure in accordance with one or more embodiments.
Figure 6:
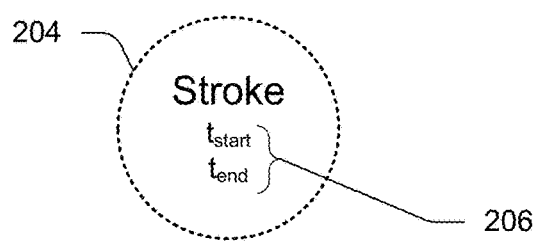

FIG. 6 depicts an example implementation scenario 600 for organizing ink strokes in a tree structure in accordance with one or more implementations. The scenario 600, for instance, represents an example way of recording and organizing the ink input 202.

In the scenario 600, the ink strokes 204a, 204b, 204c, 204d, of the ink input 202 are grouped by the time values 206 into stroke sets 602 for storage by the ink module 118. For instance, the ink module 118 organizes the ink strokes 204a, 204b, 204c, 204d, into the stroke set 602, e.g., the word "Camp" from the ink input 202. According to various implementations, the stroke set 602 is grouped by measuring a time difference between end_time and start_time of two consecutive ink strokes from the ink input 202. In one implementation, the time difference is approximately 500 ms+/−100 ms. Thus, the ink module 118 may organize the ink input 202 into the stroke sets 602 each representing a letter or word. Alternatively or additionally, the ink strokes 204 from the ink input 202 can be grouped via geometrical clustering. Consider an example where the user applies the ink input 202 and later adds more ink on the same frames of content. In the example, the ink input 202 and the ink added later could be grouped by proximity on a two-dimensional plane and grouped in a time domain.

As shown in the scenario 600, each of the ink strokes 204a, 204b, 204c, 204d, represents a letter from the ink input 202 and includes the time values 206 that specify the start_time and end_time for the each of the ink strokes 204a, 204b, 204c, 204d from the stroke set 602. The stroke set 602 includes group time values 604 defined as the minimum start_time for the ink strokes 204 in the stroke set 602 and the maximum end_time for the ink strokes 204 in the stroke set 602. For instance, the group time values 604 are defined as the start_time from the ink stroke 204a, representing the letter "C", and the end_time for the ink stroke 204d representing the letter "P".

According to various implementations, insertion and/or deletion of the ink strokes 204 follows a path of an interval tree structure. The interval tree structure represents a binary tree where the ink strokes 204 are placed on the left subtree if the time values 206 are less than the time values 206 of the consecutive set of ink strokes 204, or placed on the right subtree otherwise. When inserting the ink stroke 204 in the tree, the ink module 118 searches for the stroke set 602 less than 500 ms from start_time of the ink stroke 204 being added. If the stroke set 602 is not returned by the search, the ink module 118 creates a new stroke set 602 with the added ink stroke 204 as the root node. If the stroke set 602 is returned to the ink module 118 via the search, the new ink stroke 204 is added and the group time values 604 are recalculated for the stroke set 602.

In at least some implementations, the ink module 118 renders the ink input 202 for display by selecting the corresponding ink strokes 204 from the tree. In this way, the ink module 118 reduces a number of operations required to search ink strokes for rendering as opposed to a structure with the same number of ink strokes that does not utilize grouping techniques.

Consider an example of rendering ink strokes on video playback. For each video frame, the ink module 118 receives a timestamp and searches for the stroke set 602 with the group time values 604 containing the timestamp, from which the ink strokes 204 are selected for rendering. Selection of the ink strokes 204 includes the steps:

1. Start at the root of the tree;
2. If the current node is empty go to the last step;
3. If the end_time of the group time values 604 is less than the timestamp go to the last step;
4. If the current node contains a given tree, save it on the output list and continue;
5. If the current node start_time is greater than the timestamp, current node=left child and go back to step 2.
6. Otherwise current node=right child and go back to step 2.
7. Take all the nodes from the output list and return for further processing, e.g., rendering.

In at least some implementations, animations of the ink input 202 modify (extend or shorten) the ink timing information. In such cases, the time values 206 and/or the group time values 604 are redefined. For example, the ink input 202 animates for the same duration as when the ink was applied but remains displayed for a predefined period of time before unwinding. In this particular example: new_start_time=start_time, new_end_time=end_time+predefined period of time for static display.

Figure 7:
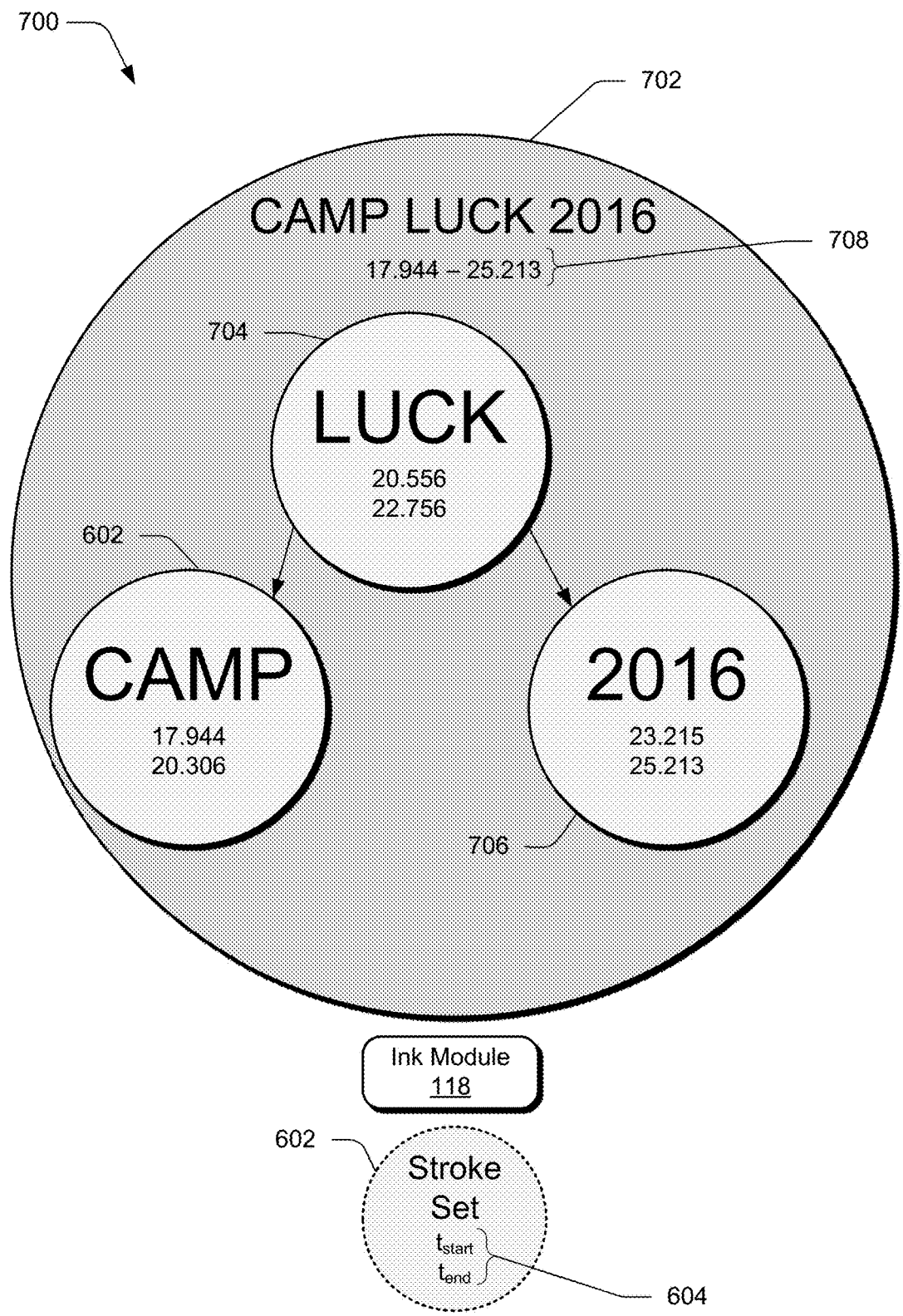
FIG. 7 depicts an example implementation scenario for organizing stroke sets in a tree structure in accordance with one or more embodiments.

FIG. 7 depicts an example implementation scenario 700 for organizing stroke sets in a tree structure in accordance with one or more implementations. The scenario 700, for instance, represents an example way of recording and organizing the ink input 202.

The scenario 700 shows the ink input 202 forming the phrase "CAMP LUCK 2016" stored as an object 702 including the stroke sets 602, 704, 706 in a binary tree structure. As shown, each of the stroke sets 602, 704, 706 represents a word from the ink input 202 and includes the group time values 604. The object 702 includes object time values 708 defined as the minimum start_time for the stroke sets 602, 704, 706 from the object 702 and the maximum end_time for the stroke sets 602, 704, 706 from the object 702.

Having discussed some example implementation scenarios, consider now a discussion of some example procedures in accordance with one or more embodiments. The example procedures may be employed in the environment 100 of FIG. 1, the system 1400 of FIG. 14 and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102), at a network-based service, and/or via cooperation between the client device 102 and a network-based service.

Figure 8:
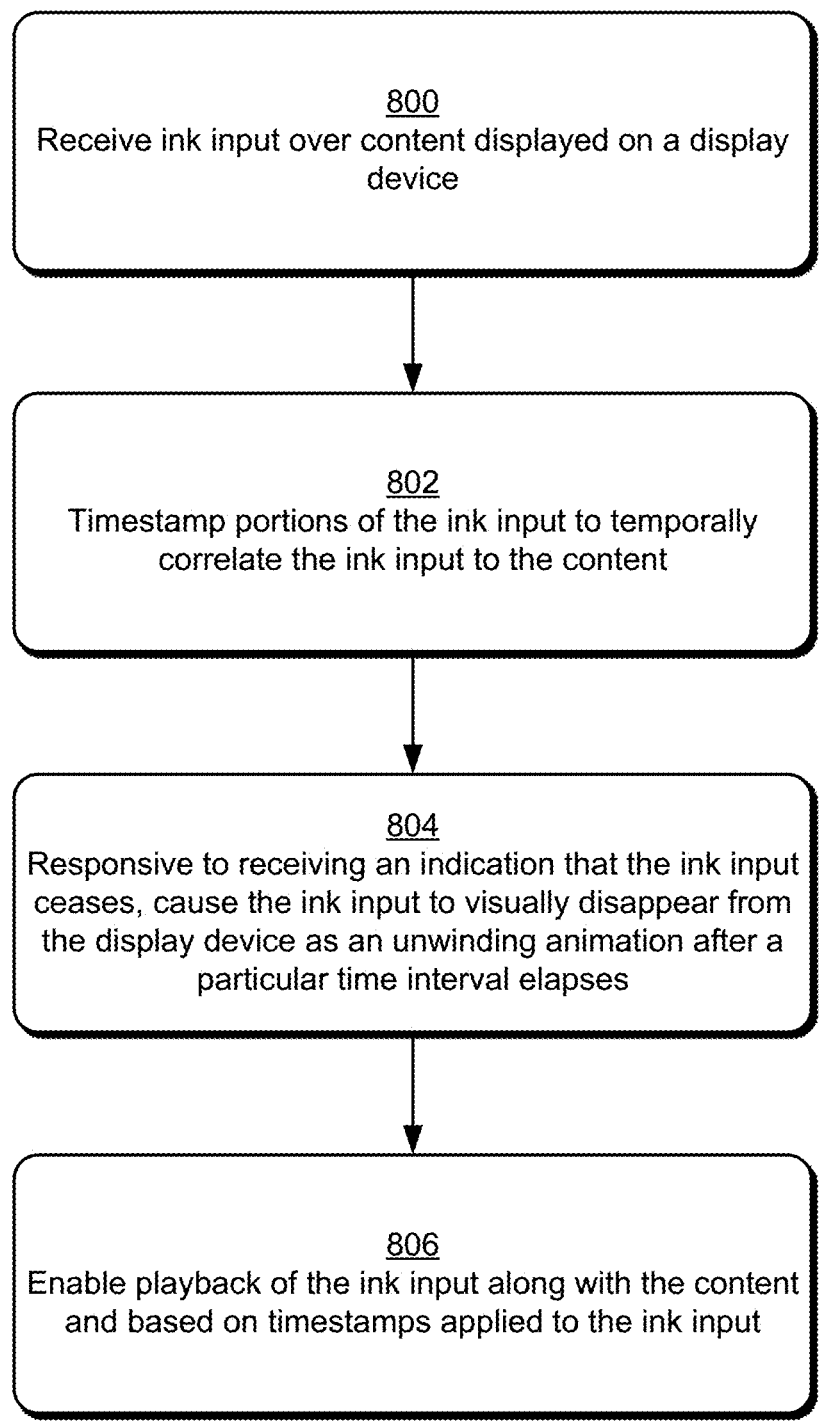
FIG. 8 is a flow diagram that describes steps in a method for removing ink input from the display device as an unwinding animation after a particular time interval elapses in accordance with one or more embodiments.

FIG. 8 is a flow diagram that describes steps in a method in accordance with one or more embodiments. The method, for instance, describes an example procedure for removing ink input from the display device as an unwinding animation after a particular time interval elapses in accordance with one or more embodiments.

Step 800 receives ink input over content displayed on a display device. The ink module 118, for instance, receives input via an input mechanism 112 at a point over the video content 120 displayed on the GUI 126. In at least some implementations, the ink input 202 is received when the pen 132 contacts or hovers over the surface of the display device 110.

Step 802 timestamps portions of the ink input to temporally correlate the ink input to the content. In one implementation, the ink module 118 receives the time values 206 for the video content 120 from the video player 122 via a call to the ink APIs 124. For instance, the start_time and end_time of the ink input 202 are recorded by the ink module 118 to temporally correlate the video content 120 with the pen_down and pen_up times for the ink input 202. Additional examples of correlating the timestamp to the ink strokes 204 of the ink input 202 are detailed throughout this description.

Responsive to receiving an indication that ink input ceases, step 804 causes the ink input to visually disappear from the display device as an unwinding animation after a particular time interval elapses. In at least some implementations, the ink module 118 starts the timer 302 in response to the ink input 202 ceasing for a particular period of time. For instance, the timer 302 is started by the ink module 118 after a 500 ms+/−100 ms interval following a pen_up. At the expiration of the timer 302, the ink module 118 causes the ink input 202 to visually unwind in the direction and order that the ink input 202 is received. According to one implementation, the ink input 202 visually unwinds as an animation based on a total duration of the ink input 202 such that the ink input 202 unwinds at a constant rate. In an alternative implementation, the ink input 202 unwinds as an animation based on the time values 206 of each ink stroke 204 from the ink input 202 such that each ink stroke 204 unwinds at the velocity in which the respective ink stroke 204 was applied.

Step 806 enables playback of the ink input along with the content and based on timestamps applied to the ink input. According to some implementations, the ink module 118 causes the ink input 202 to reappear over the video content 120 at a playback point of the video content 120 at which the ink input 202 was originally applied. For instance, the ink input 202 is presented via an animation at the velocity that the ink input 202 was originally applied by the pen 132 based on the time values 206. In one implementation, the ink module 118 causes the ink input 202 to reappear over the video content 120 by rendering the ink strokes 204 and/or the stroke sets 602 of the ink input 202 from the binary tree structure based on the time values 206 correlated to playback of the video content 120. For example, the binary tree structure is a self-balancing data structure searchable by the ink module 118 to render the ink input 202 for display via the GUI 126.

Figure 9:
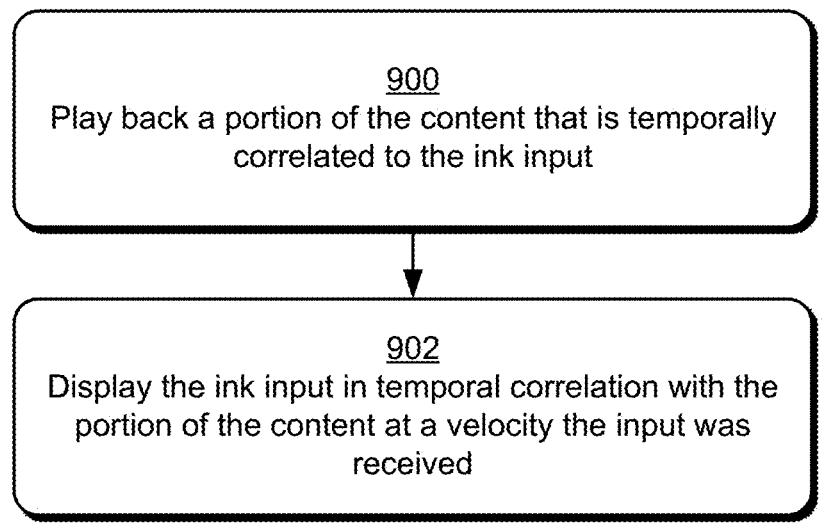
FIG. 9 is a flow diagram that describes steps in a method for displaying ink input in temporal correlation with a portion of content at a velocity the input was received in accordance with one or more embodiments.

FIG. 9 is a flow diagram that describes steps in a method in accordance with one or more embodiments. The method, for instance, describes an example procedure for displaying ink input in temporal correlation with a portion of content at a velocity the input was received in accordance with one or more embodiments.

Step 900 plays back a portion of the content that is temporally correlated to the ink input. For example, the video content 120 is played back by the video player 122 via the GUI 126. In response to the video content 120 playing back, the ink module 118, in at least some implementations, searches the time values 206 and/or the group time values 604 stored with the ink input 202.

Step 902 displays the ink input in temporal correlation with the portion of the content at a velocity the input was received. According to various implementations, the ink input 202 is displayed over the video content 120 such that the ink input 202 is played back as an animation at a playback point of the video content 120 when the ink input 202 was originally applied based on the time values 206. For example, the ink strokes 204 and/or stroke sets 602 that correlate to the time values 206 are retrieved by the ink module for display over the video content 120. According to one implementation, the ink input 202 is retrieved by the ink module 118 as the ink strokes 204 and/or the stroke sets 602 stored as a self-balancing binary tree structure.

Figure 10:
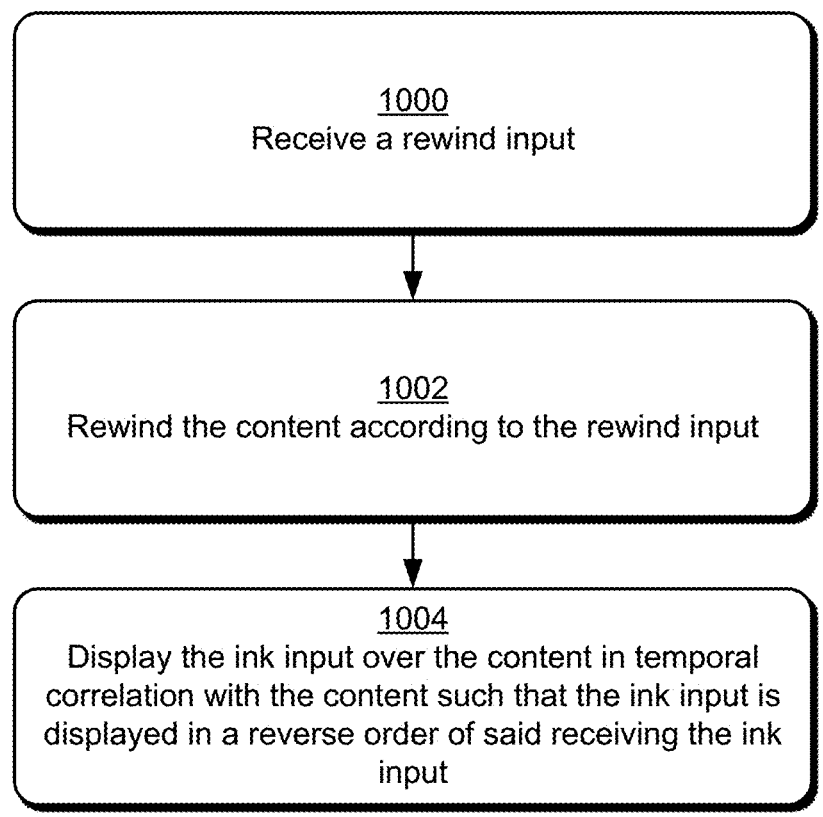
FIG. 10 is a flow diagram that describes steps in a method for displaying ink input over content in temporal correlation with content such that the ink input is displayed in a reverse order in accordance with one or more embodiments.

FIG. 10 is a flow diagram that describes steps in a method in accordance with one or more embodiments. The method, for instance, describes an example procedure for displaying ink input over content in temporal correlation with content such that the ink input is displayed in a reverse order in accordance with one or more embodiments.

Step 1000 receives a rewind input. For instance, the video player 122 receives an input via an input mechanism 112 swiping the time marker 130 in a reverse direction of a playback direction. In one implementation, the input is received via a finger of a user contacting the surface of the display device 110 over the time marker 130.

Step 1002 rewinds the content according to the rewind input. The video player 122 causes playback of the video content 120 on the GUI 126 in a reverse direction from a playback direction such that the video content 120 is played back in reverse.

Step 1004 displays the ink input over the content in temporal correlation with the content such that the ink input is displayed in a reverse order of said receiving the ink input. According to some implementations, the ink module 118 causes the ink strokes 204 and/or the stroke sets 602 to display in a reverse order over the video content 120 based on the time values 206. For example, during rewind playback of the video content 120, the ink module 118 retrieves the ink strokes 204d, 204c, 204b, 204a, respectively, due to the ink stroke 204d including the highest end_time from the stroke set 602. Continuing the example, the ink strokes 204d, 204c, 204b, 204a, are rendered for display respectively as an animation over the video content 120 and in temporal correlation with the rewind playback of the video content 120 such that the stroke set 602 is displayed in a reverse order from the order in which the stroke set 602 was applied.

Figure 11:
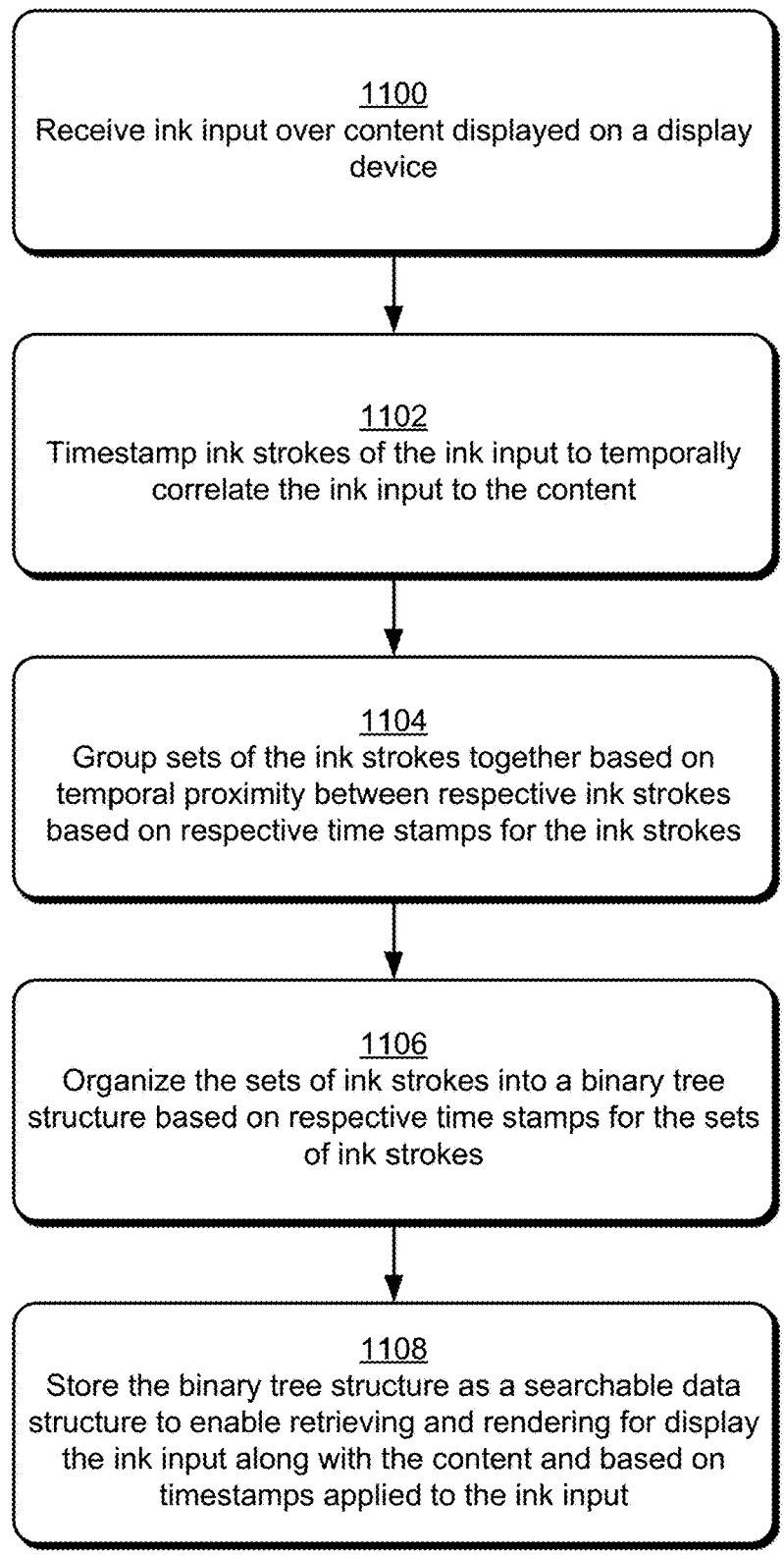
FIG. 11 is a flow diagram that describes steps in a method for organizing sets of ink strokes into a binary tree structure based on respective time stamps for the sets of ink strokes in accordance with one or more embodiments.

FIG. 11 is a flow diagram that describes steps in a method in accordance with one or more embodiments. The method, for instance, describes an example procedure for organizing sets of ink strokes into a binary tree structure based on respective time stamps for the sets of ink strokes in accordance with one or more embodiments.

Step 1100 receives ink input over content displayed on a display device. According to various implementations, the ink module 118 receives input from the pen 132 contacting and/or hovering near the surface of the display device 110 during playback of the video content 120 on the display device.

Step 1102 timestamps ink strokes of the ink input to temporally correlate the ink input to the content. As described above, the ink module 118 registers the timestamps of the ink input 202 by recording the time values 206 correlating to playback of the video content 120 playback, e.g., the start_time and end_time. For instance, the time values 206 of the ink input 202 are determined based on the ink module 118 recording the pen_down, pen_up, offset_time, and duration. In some implementations, the ink module 118 receives the time values 206 from the video player 122 via a call to the ink APIs 124.

Step 1104 groups sets of the ink strokes together based on temporal proximity between respective ink strokes based on respective time stamps for the ink strokes. According to various implementations, the ink module 118 groups the ink strokes 204a, 204b, 204c, 204d, into the stroke set 602 based on a threshold interval between consecutive ink strokes, as indicated by the time values 206. For example, the threshold interval is 500 ms and the stroke set 602 includes consecutive ink strokes 204 with end_time and start_time separated by less than the threshold interval. In the example, the ink strokes 204 within the threshold interval are stored as the stroke set 602 along with the respective time values 206.

Step 1106 organizes the sets of ink strokes into a binary tree structure based on respective time stamps for the sets of ink strokes. In one implementation, each of the ink strokes 204a, 204b, 204c, 204d, represents a letter from the ink input 202 and includes the time values 206 that specify the start_time and end_time for the each of the ink strokes 204a, 204b, 204c, 204d from the stroke set 602. The stroke set 602 includes the group time values 604 defined as the minimum start_time for the ink strokes 204 in the stroke set 602 and the maximum end_time for the ink strokes 204 in the stroke set 602.

Step 1108 stores the binary tree structure as a searchable data structure to enable retrieving and rendering for display the ink input along with the content and based on timestamps applied to the ink input. According to various implementations, the binary tree structure is organized such that the ink strokes 204 are placed on the left subtree if the time values 206 are less than the time values 206 of the consecutive set of the ink strokes 204, or placed on the right subtree otherwise. For instance, when inserting the ink stroke 204 in the tree, the ink module 118 searches for the stroke set 602 less than 500 ms from start_time of the ink stroke 204 being added. If the stroke set 602 is not returned by the search, the ink module 118 creates a new stroke set 602 with the added ink stroke 204 as the root node. If the stroke set 602 is returned to the ink module 118 via the search, the new ink stroke 204 is added and the group time values 604 are recalculated for the stroke set 602. In this way, the ink module 118 reduces a number of operations required to search ink strokes for rendering as opposed to a structure with the same number of ink strokes that does not utilize grouping techniques.

Figure 12:
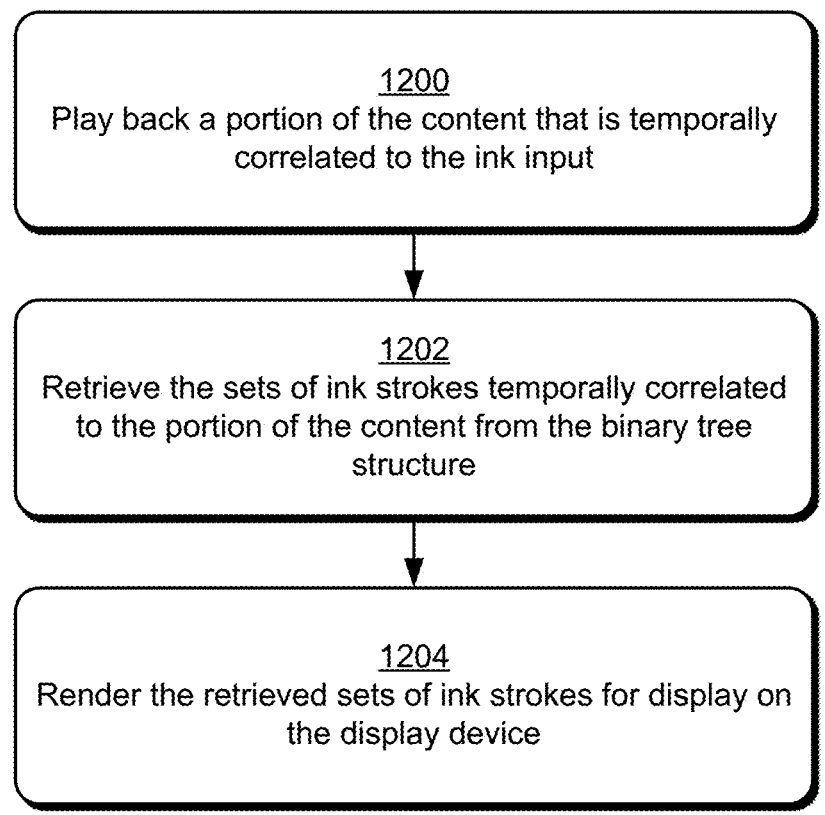
FIG. 12 is a flow diagram that describes steps in a method for retrieving sets of ink strokes temporally correlated to a portion of content from a binary tree structure in accordance with one or more embodiments.

FIG. 12 is a flow diagram that describes steps in a method in accordance with one or more embodiments. The method, for instance, describes an example procedure for retrieving sets of ink strokes temporally correlated to a portion of content from a binary tree structure in accordance with one or more embodiments.

Step 1200 plays back a portion of the content that is temporally correlated to the ink input. For example, the video content 120 is played back by the video player 122 on the GUI 126. In response to the video content 120 playing back, the ink module 118 receives the time values 206 for playback from the video player 122.

Step 1202 retrieves the sets of ink strokes temporally correlated to the portion of content from the binary tree structure. In at least some implementations, for each video frame the ink module 118 receives a timestamp and searches for the stroke set 602 with the group time values 604 containing the time values 206 that correlate to the timestamp.

Step 1204 rendering the retrieved sets of ink strokes for display on the display device. For example, the ink strokes 204 and/or the stroke sets 602 that correlate to the time values 206 are retrieved by the ink module 118 for display over the video content 120. According to one implementation, the ink input 202 is retrieved by the ink module 118 as the ink strokes 204 and or the stroke sets 602 stored as a self-balancing binary tree structure.

Figure 13:
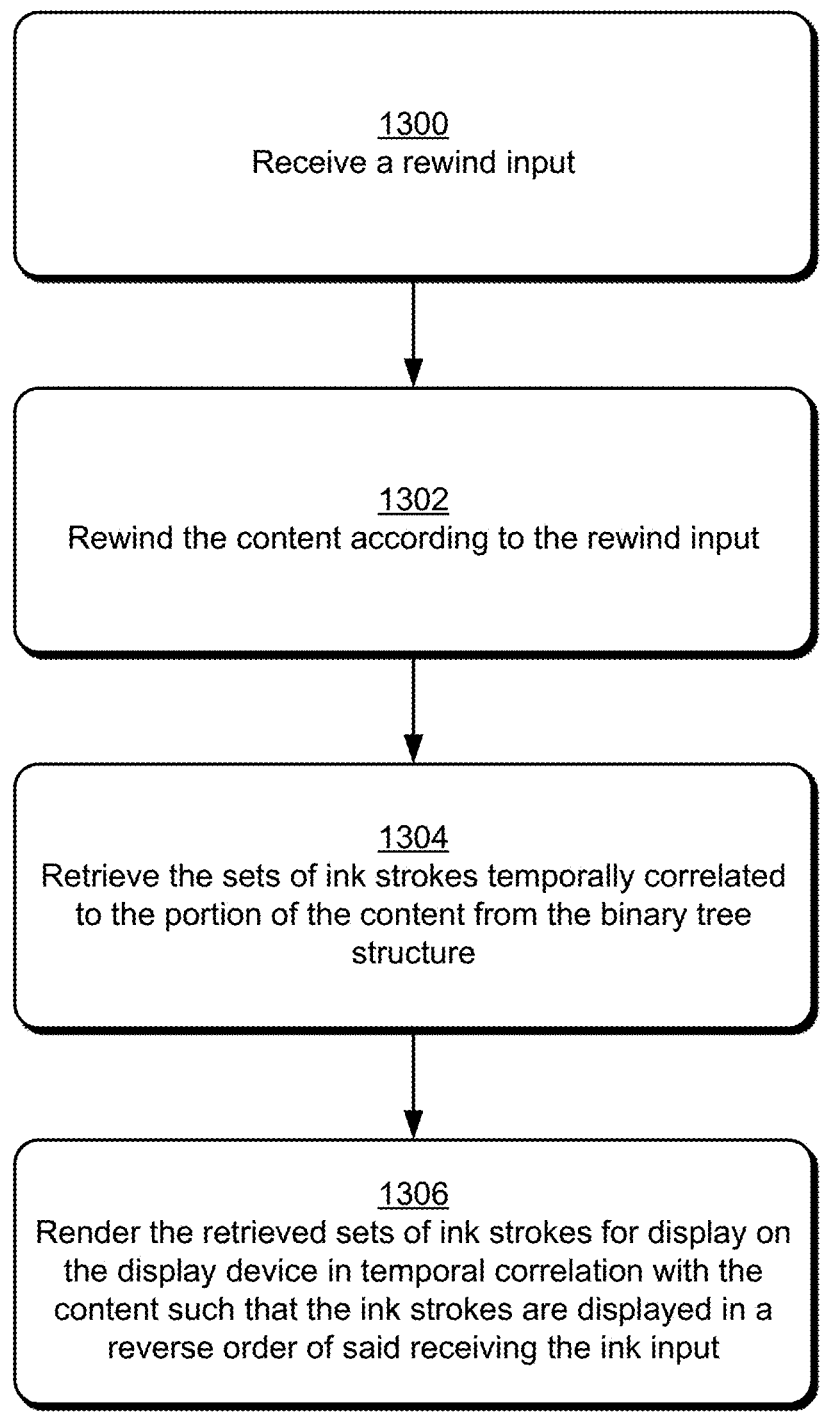
FIG. 13 is a flow diagram that describes steps in a method for rendering sets of ink strokes for display in temporal correlation with rewinding content in accordance with one or more embodiments.

FIG. 13 is a flow diagram that describes steps in a method in accordance with one or more embodiments. The method, for instance, describes an example procedure for rendering sets of ink strokes for display in temporal correlation with rewinding content in accordance with one or more embodiments.

Step 1300 receives a rewind input. For instance, the video player 122 receives an input via an input mechanism 112 swiping the time marker 130 in a reverse direction of a playback direction. In one implementation, the input is received via a finger of a user contacting the surface of the display device 110 over the time marker 130.

Step 1302 rewinds the content according to the rewind input. The video player 122 causes playback of the video content 120 on the GUI 126 in a reverse direction from a playback direction such that the video content 120 is played back in reverse.

Step 1304 retrieves the sets of ink strokes temporally correlated to the portion of content from the binary tree structure. In at least one implementation, the ink strokes 204 are stored as a searchable binary tree structure. In a specific implementation, the tree structure is self-balancing and selection of the ink strokes 204 includes the ink module 118 performing the steps: start at the root of the tree; if the current node is empty go to the last step; if the end_time of the group time values 604 is less than the timestamp go to the last step; if the current node contains a given tree, save it on the output list and continue; if the current node start_time is greater than the timestamp, current node=left child and go back to step 2; otherwise, current node=right child and go back to step 2; take all the nodes from the output list and return.

Step 1306 renders the retrieved sets of ink strokes for display on the display device in temporal correlation with the content such that the ink strokes are displayed in a reverse order of said receiving the ink input. For example, the retrieved ink strokes 204d, 204c, 204b, 204a, are rendered for display respectively as an animation over the video content 120 and in temporal correlation with the rewind playback of the video content 120 such that the stroke set 602 is displayed in a reverse order from the order in which the stroke set 602 was applied.

Example System and Device

Figure 14:
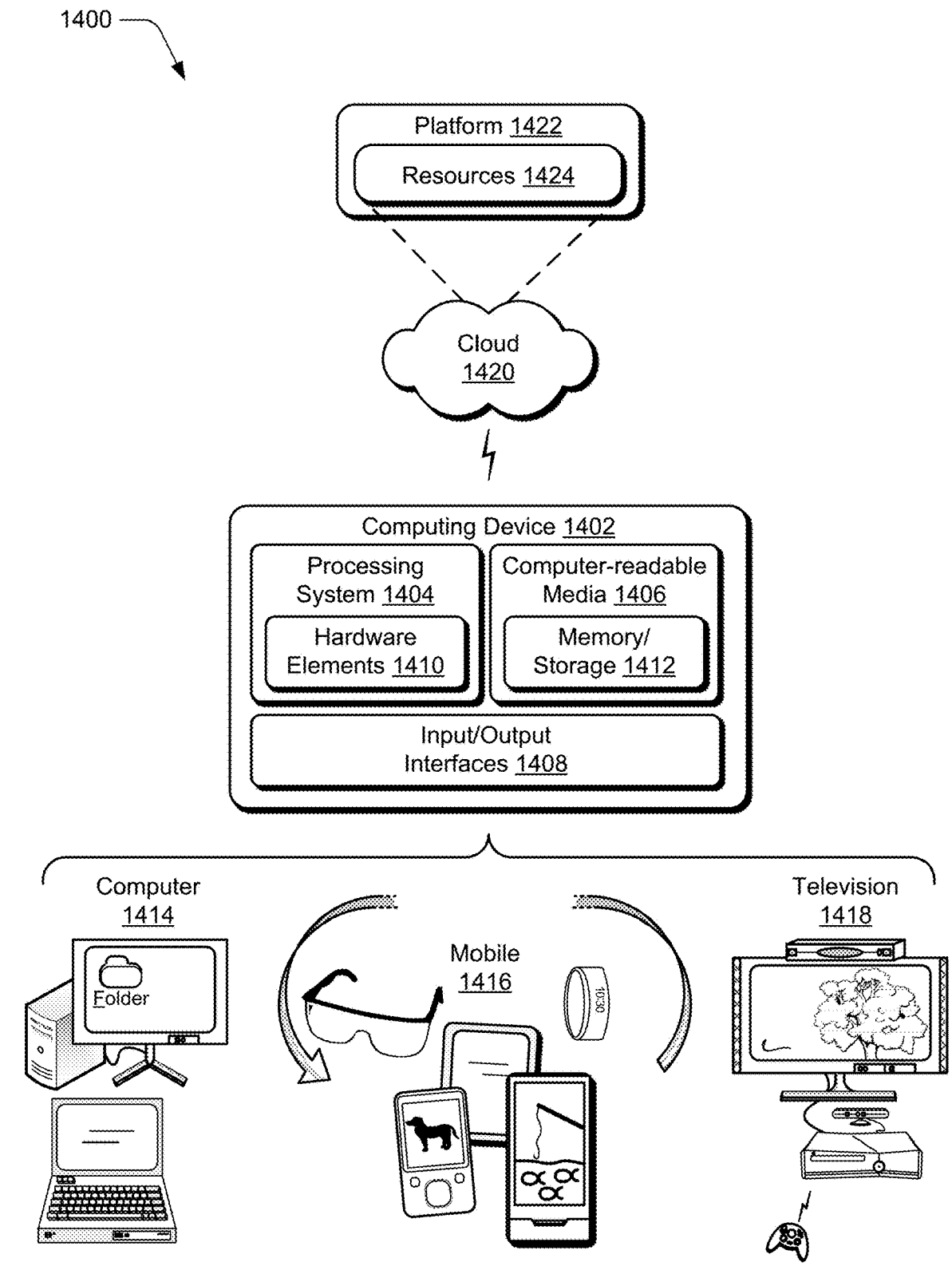
FIG. 14 illustrates an example system and computing device as described with reference to FIG. 1, which are configured to implement embodiments of techniques described herein.

FIG. 14 illustrates an example system generally at 1400 that includes an example computing device 1402 that is representative of one or more computing systems and/or devices that may implement various techniques described herein. For example, the client device 102 discussed above with reference to FIG. 1 can be embodied as the computing device 1402. The computing device 1402 may be, for example, a server of a service provider, a device associated with the client (e.g., a client device), an on-chip system, and/or any other suitable computing device or computing system.

The example computing device 1402 as illustrated includes a processing system 1404, one or more computer-readable media 1406, and one or more Input/Output (I/O) Interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1406 is illustrated as including memory/storage 1412. The memory/storage 1412 represents memory/storage capacity associated with one or more computer-readable media. The memory/storage 1412 may include volatile media (such as random access memory (RAM)) and/or nonvolatile media (such as read only memory (ROM), Flash memory, optical disks, magnetic disks, and so forth). The memory/storage 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media, and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1410 and computer-readable media 1406 are representative of instructions, modules, programmable device logic, and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of modules that are executable by the computing device 1402 as software may be achieved at least partially in hardware, e.g., through use of computer-readable storage media and/or hardware elements 1410 of the processing system. The instructions and/or functions may be executable/operable by one or more articles of manufacture (for example, one or more computing devices 1402 and/or processing systems 1404) to implement techniques, modules, and examples described herein.

As further illustrated in FIG. 14, the example system 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1402 may assume a variety of different configurations, such as for computer 1414, mobile 1416, and television 1418 uses. Each of these configurations includes devices that may have generally different constructs and capabilities, and thus the computing device 1402 may be configured according to one or more of the different device classes. For instance, the computing device 1402 may be implemented as the computer 1414 class of a device that includes a personal computer, desktop computer, a multi-screen computer, laptop computer, netbook, and so on.

The computing device 1402 may also be implemented as the mobile 1416 class of device that includes mobile devices, such as a mobile phone, portable music player, portable gaming device, a tablet computer, a wearable device, a multi-screen computer, and so on. The computing device 1402 may also be implemented as the television 1418 class of device that includes devices having or connected to generally larger screens in casual viewing environments. These devices include televisions, set-top boxes, gaming consoles, and so on.

The techniques described herein may be supported by these various configurations of the computing device 1402 and are not limited to the specific examples of the techniques described herein. For example, functionalities discussed with reference to the client device 102 and/or the ink module 118 may be implemented all or in part through use of a distributed system, such as over a "cloud" 1420 via a platform 1422 as described below.

The cloud 1420 includes and/or is representative of a platform 1422 for resources 1424. The platform 1422 abstracts underlying functionality of hardware (e.g., servers) and software resources of the cloud 1420. The resources 1424 may include applications and/or data that can be utilized while computer processing is executed on servers that are remote from the computing device 1402. Resources 1424 can also include services provided over the Internet and/or through a subscriber network, such as a cellular or Wi-Fi network.

The platform 1422 may abstract resources and functions to connect the computing device 1402 with other computing devices. The platform 1422 may also serve to abstract scaling of resources to provide a corresponding level of scale to encountered demand for the resources 1424 that are implemented via the platform 1422. Accordingly, in an interconnected device embodiment, implementation of functionality described herein may be distributed throughout the system 1400. For example, the functionality may be implemented in part on the computing device 1402 as well as via the platform 1422 that abstracts the functionality of the cloud 1420.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for organizing sets of ink strokes into a binary tree structure based on respective time stamps, the system comprising: one or more processors; and one or more computer-readable storage media storing computer-executable instructions that, responsive to execution by the one or more processors, cause the system to perform operations including: receiving ink input over content displayed on a display device; timestamping ink strokes of the ink input to temporally correlate the ink input to the content; grouping sets of the ink strokes together based on temporal proximity between respective ink strokes based on respective time stamps for the ink strokes; organizing the sets of ink strokes into a binary tree structure based on respective time stamps for the sets of ink strokes; and storing the binary tree structure as a searchable data structure to enable retrieving and rendering for display the ink input along with the content and based on timestamps applied to the ink input.

In addition to any of the above described systems, any one or combination of: wherein the operations further include grouping the sets of ink strokes into ink objects based on respective time stamps for the sets of ink strokes; wherein the operations further include grouping sets of the ink strokes together based on geometrical clustering between respective ink strokes of the ink input; wherein the binary tree structure is self-balancing; wherein the operations further include: playing back a portion of the content that is temporally correlated to the ink input; retrieving the sets of ink strokes temporally correlated to the portion of the content from the binary tree structure; and rendering the retrieved sets of ink strokes for display on the display device; wherein the operations further include: receiving a rewind input; rewinding the content according to the rewind input; retrieving the sets of ink strokes temporally correlated to a portion of the content from the binary tree structure; rendering the retrieved sets of ink strokes for display on the display device in temporal correlation with the content such that the ink strokes are displayed in a reverse order of said receiving the ink input.

A computer-implemented method for removing ink input from a display as an unwinding animation, the method comprising: receiving ink input over content displayed on a display device; timestamping portions of the ink input to temporally correlate the ink input to the content; responsive to receiving an indication that the ink input ceases, causing the ink input to visually disappear from the display device as an unwinding animation after a particular time interval elapses; and enabling playback of the ink input along with the content and based on timestamps applied to the ink input.

In addition to any of the above described methods, any one or combination of: further comprising grouping sets of ink strokes together based on temporal proximity between respective ink strokes of the ink input; further comprising organizing ink strokes of the ink input into a tree structure and based on respective time stamps for the ink strokes;

further comprising organizing ink strokes of the ink input into a binary tree structure stored as a searchable data structure and based on respective time stamps for the ink strokes; further comprising organizing ink strokes of the ink input into a self-balancing binary tree structure and based on respective time stamps for the ink strokes; further comprising: receiving a rewind input; rewinding the content according to the rewind input; and displaying the ink input over the content in temporal correlation with the content such that the ink input is displayed in a reverse order of said receiving the ink input; further comprising: playing back a portion of the content that is temporally correlated to the ink input; and displaying the ink input in temporal correlation with the portion of the content at a velocity in which the input was received.

A computer-implemented method for organizing sets of ink strokes into a binary tree structure based on respective time stamps, the method comprising: receiving ink input over content displayed on a display device; timestamping ink strokes of the ink input to temporally correlate the ink input to the content; grouping sets of the ink strokes together based on temporal proximity between respective ink strokes based on respective time stamps for the ink strokes; organizing the sets of ink strokes into a binary tree structure based on respective time stamps for the sets of ink strokes; and storing the binary tree structure as a searchable data structure to enable retrieving and rendering for display the ink input along with the content and based on timestamps applied to the ink input.

In addition to any of the above described methods, any one or combination of: further comprising grouping the sets of ink strokes into ink objects based on respective time stamps for the sets of ink strokes; further comprising grouping sets of the ink strokes together based on geometrical clustering between respective ink strokes of the ink input; wherein the binary tree structure is self-balancing; further comprising: playing back a portion of the content that is temporally correlated to the ink input; retrieving the sets of ink strokes temporally correlated to the portion of the content from the binary tree structure; and rendering the retrieved sets of ink strokes for display on the display device; further comprising: receiving a rewind input; rewinding the content according to the rewind input; retrieving the sets of ink strokes temporally correlated to a portion of the content from the binary tree structure; and rendering the retrieved sets of ink strokes for display on the display device in temporal correlation with the content such that the ink strokes are displayed in a reverse order of said receiving the ink input; further comprising displaying the ink input as an animation rendered at a velocity in which the ink input was received and in temporal correlation with a portion of the content during playback of the portion of the content.

CONCLUSION

Techniques for time-correlated ink are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
one or more processors; and
one or more computer-readable storage media storing computer-executable instructions that, responsive to execution by the one or more processors, cause the system to perform operations including:
displaying previously stored ink input over video content displayed on a display device, the displaying the ink input based on timestamps applied to ink strokes of the ink input, the timestamps temporally correlating the ink input to the video content, each timestamp indicating a playback time for the video content in which the corresponding ink stroke is displayed;
causing an ink stroke of the ink input to visually unwind, the visual unwinding comprising gradually removing the ink stroke from view on the display device as an unwinding animation that imitates a way the ink input corresponding to the ink stroke was received.

2. The system as described in claim 1, the visually unwinding of the ink stroke comprising a velocity of visually unwinding, the velocity based on the timestamp associated with the ink stroke caused to unwind.

3. The system as described in claim 1, the visually unwinding of the ink stroke comprising a velocity of visually unwinding, the velocity based on a distance between a start and end of the ink stroke caused to unwind.

4. The system as described in claim 1, the visually unwinding of the ink stroke comprising a velocity of visually unwinding, the velocity based on a sampling rate of the ink stroke caused to unwind.

5. The system as described in claim 1, wherein the operations further include:
receiving a rewind input;
rewinding the video content according to the rewind input;
retrieving the ink strokes of the previously stored ink input that are temporally correlated to a portion of the video content; and
rendering the retrieved ink strokes for display on the display device in temporal correlation with the video content such that the ink strokes are displayed in the reverse of the order in which they were received.

6. A computer-implemented method comprising:
receiving ink strokes that are input over video content displayed on a display device;
timestamping and storing the ink strokes to temporally correlate the ink strokes to the video content, wherein a timestamp for an ink stroke indicates a corresponding playback time for the video content in which the ink stroke is applied;
responsive to receiving an indication that input of an ink stroke ceases, causing the ink stroke to visually unwind, the visual unwinding comprising gradually removing the ink stroke from the display device as an unwinding animation that imitates a way the ink stroke was received; and
enabling playback of the ink strokes along with the video content and based on timestamps applied to the ink strokes.

7. The method as described in claim 6, the visually unwinding comprising a velocity of visually unwinding, the velocity based on at least one of: the timestamp associated with the ink stroke caused to unwind, a distance between a start and end of the ink stroke caused to unwind, or a sampling rate of the ink stroke caused to unwind.

8. The method as described in claim 6, further comprising:
receiving a rewind input;
rewinding the video content according to the rewind input; and displaying the ink strokes over the video content in temporal correlation with the video content such that the ink strokes are displayed in the reverse of the order in which they were received.

9. The method as described in claim 6, further comprising:
playing back a portion of the video content that is temporally correlated to at least some of the ink strokes; and
displaying the at least some of the ink strokes in temporal correlation with the portion of the video content at the same velocity with which the ink strokes were input.

10. A computer-implemented method comprising:
displaying previously stored ink input over video content displayed on a display device, the displaying the ink input based on timestamped ink strokes of the ink input, the timestamps temporally correlating the ink input to the video content, each timestamp indicating a corresponding playback time for the video content in which an ink stroke is displayed;
causing an ink stroke of the ink input to visually unwind, the visual unwinding comprising gradually removing the ink stroke from view on the display device as an unwinding animation that imitates a way the ink input corresponding to the ink stroke was received.

11. The method as described in claim 10, further comprising grouping at least some of the ink strokes of the ink input into ink objects based on the respective time stamps for the ink strokes.

12. The method as described in claim 10, further comprising grouping at least some of the ink strokes together based on geometrical clustering between respective ink strokes of the ink input.

13. The method as described in claim 10, further comprising:
receiving a rewind input;
rewinding the video content according to the rewind input;
retrieving the ink strokes of the previously stored ink input that are temporally correlated to a portion of the video content; and
rendering the retrieved ink strokes for display on the display device in temporal correlation with the video content such that the ink strokes are displayed in the reverse of the order in which they were received.

14. The method as described in claim 10, further comprising displaying each of the ink strokes of the ink input as an animation rendered at a velocity in which the respective ink stroke was received.

15. The method of claim 8, wherein the displayed ink strokes are each rendered backward from the end of the ink stroke to the beginning of the ink stroke.

16. The method as described in claim 9, further comprising:
causing a displayed ink stroke to visually unwind, the visual unwinding comprising gradually removing the ink stroke from view on the display device as an unwinding animation that imitates a way the ink stroke was received.

17. The method as described in claim 16, the visually unwinding comprising a velocity of visually unwinding, the velocity based on at least one of: the timestamps associated with the ink stroke, a distance between a start and end of the ink stroke or a sampling rate of the ink stroke.

18. The method as described in claim 10, the visually unwinding of the ink stroke comprising a velocity of visually unwinding, the velocity based on the timestamps associated with the ink stroke caused to unwind.

19. The method as described in claim 10, the visually unwinding of the ink stroke comprising a velocity of visually unwinding, the velocity based on a distance between a start and end of the ink stroke caused to unwind.

20. The method as described in claim 10, the visually unwinding of the ink stroke comprising a velocity of visually unwinding, the velocity based on a sampling rate of the ink stroke caused to unwind.

* * * * *